(12) United States Patent
Lin

(10) Patent No.: US 6,907,431 B2
(45) Date of Patent: Jun. 14, 2005

(54) METHOD FOR DETERMINING A LOGICAL STRUCTURE OF A DOCUMENT

(75) Inventor: Xiaofan Lin, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 369 days.

(21) Appl. No.: 10/139,041

(22) Filed: May 3, 2002

(65) Prior Publication Data

US 2003/0208502 A1 Nov. 6, 2003

(51) Int. Cl.[7] .............................................. G06F 17/30
(52) U.S. Cl. ...................... 707/102; 707/101; 715/513
(58) Field of Search ................................ 707/100–102; 715/907, 911

(56) References Cited

U.S. PATENT DOCUMENTS

| 5,921,582 | A | * | 7/1999 | Gusack | ........................ 283/67 |
| 6,055,544 | A | * | 4/2000 | DeRose et al. | .......... 707/104.1 |
| 6,199,098 | B1 | * | 3/2001 | Jones et al. | .................. 709/203 |
| 6,633,887 | B2 | * | 10/2003 | Suzuki et al. | ................ 707/102 |
| 6,728,403 | B1 | * | 4/2004 | Jang et al. | .................. 382/180 |
| 2002/0083096 | A1 | * | 6/2002 | Hsu et al. | |

* cited by examiner

*Primary Examiner*—Greta Robinson
*Assistant Examiner*—Debbie M Le

(57) ABSTRACT

A method for determining a logical structure of a document. At least one candidate table of contents page of the document is determined, wherein the table of contents page comprises a plurality of table of contents words. The document comprises at least one table of contents page and a plurality of body pages, wherein at least one body page comprises a plurality of body words. A dictionary is built for the candidate table of contents page, the dictionary comprising at least one table of contents word. One body page is analyzed for at least one text match between the plurality of body words and the table of contents words of the dictionary. Based on an evaluation the text match, it is determined whether the body page is a title page.

27 Claims, 17 Drawing Sheets

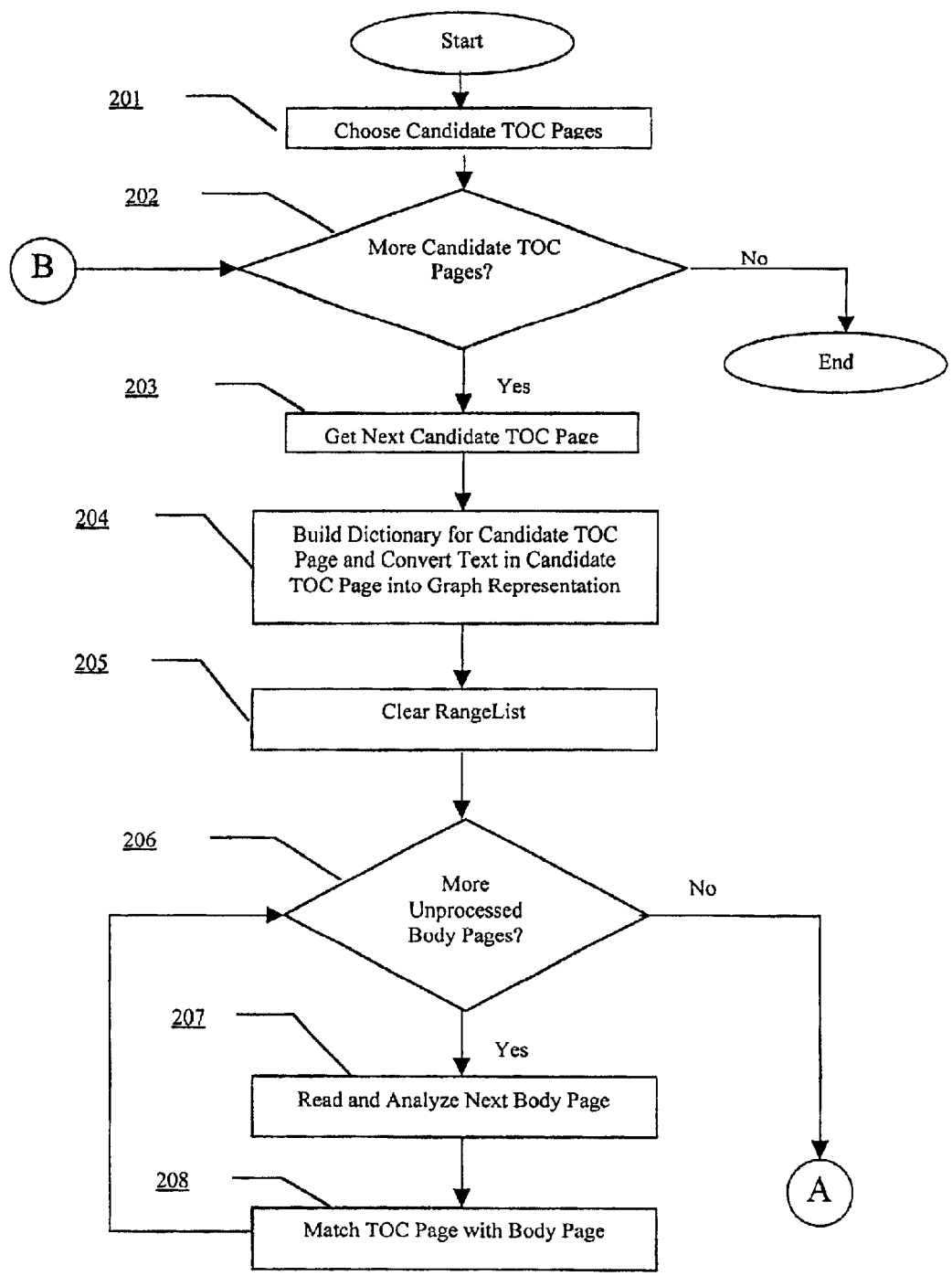

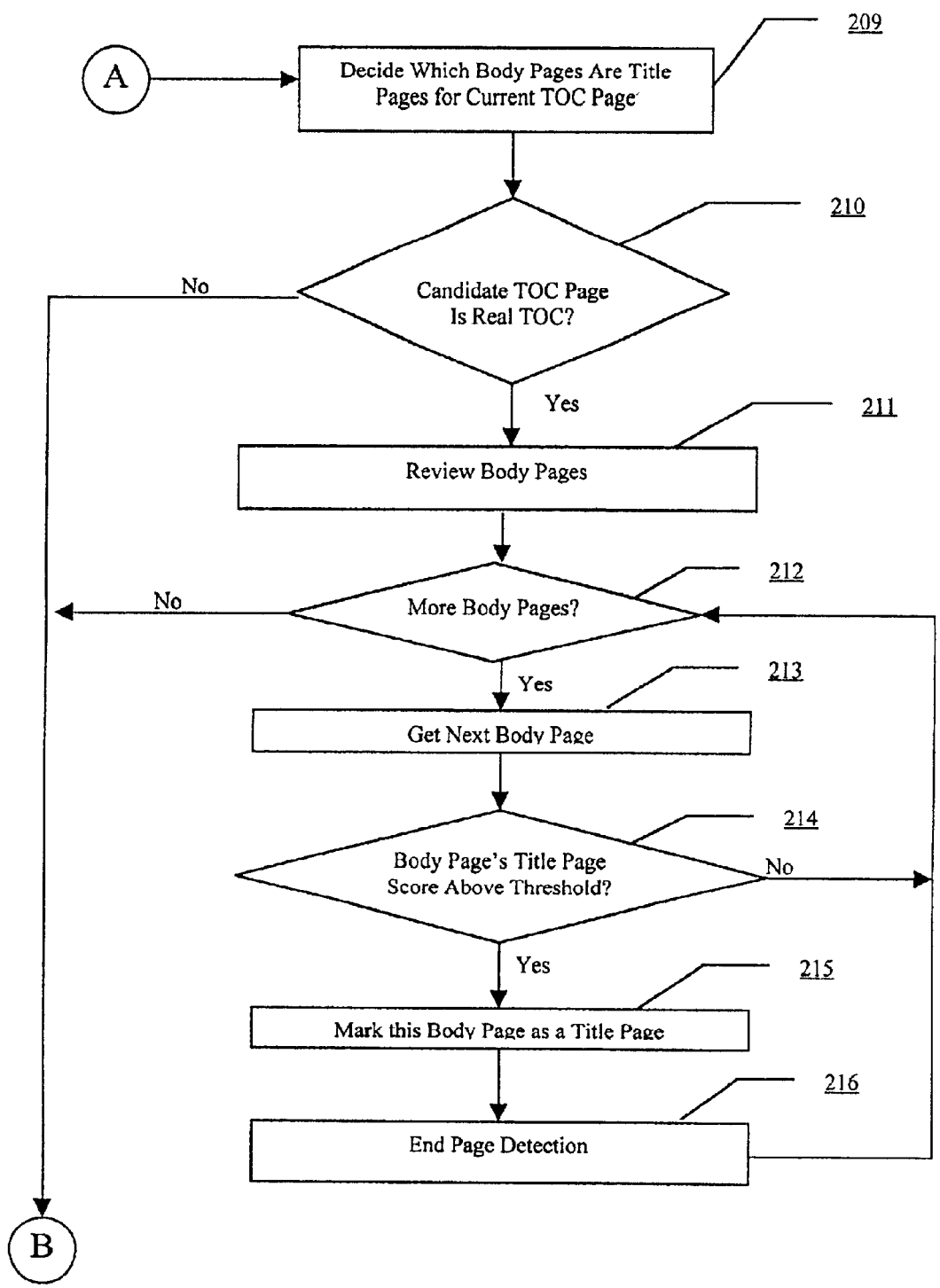

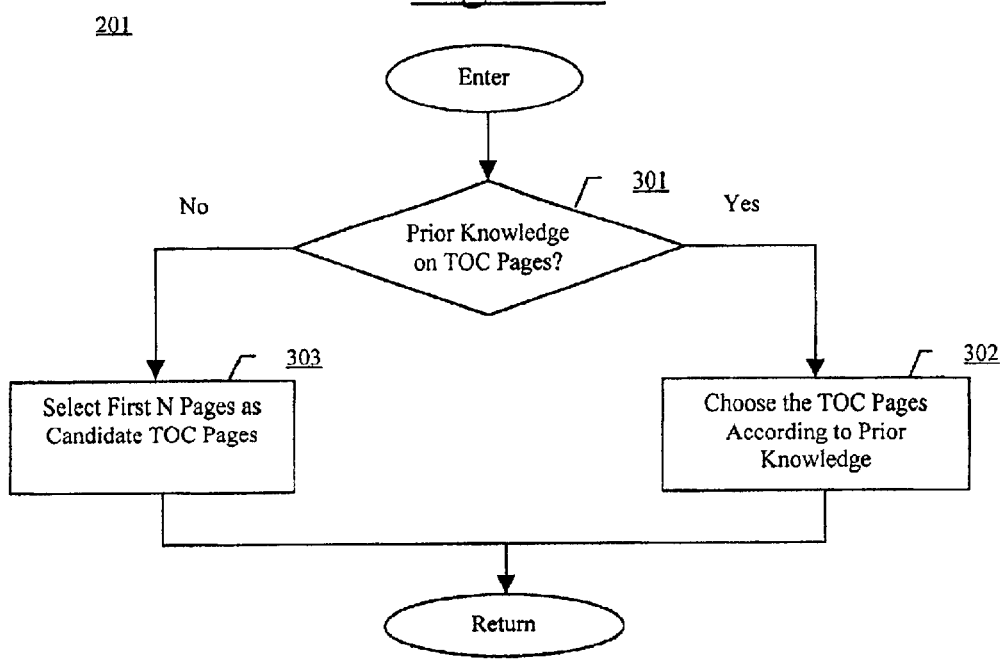

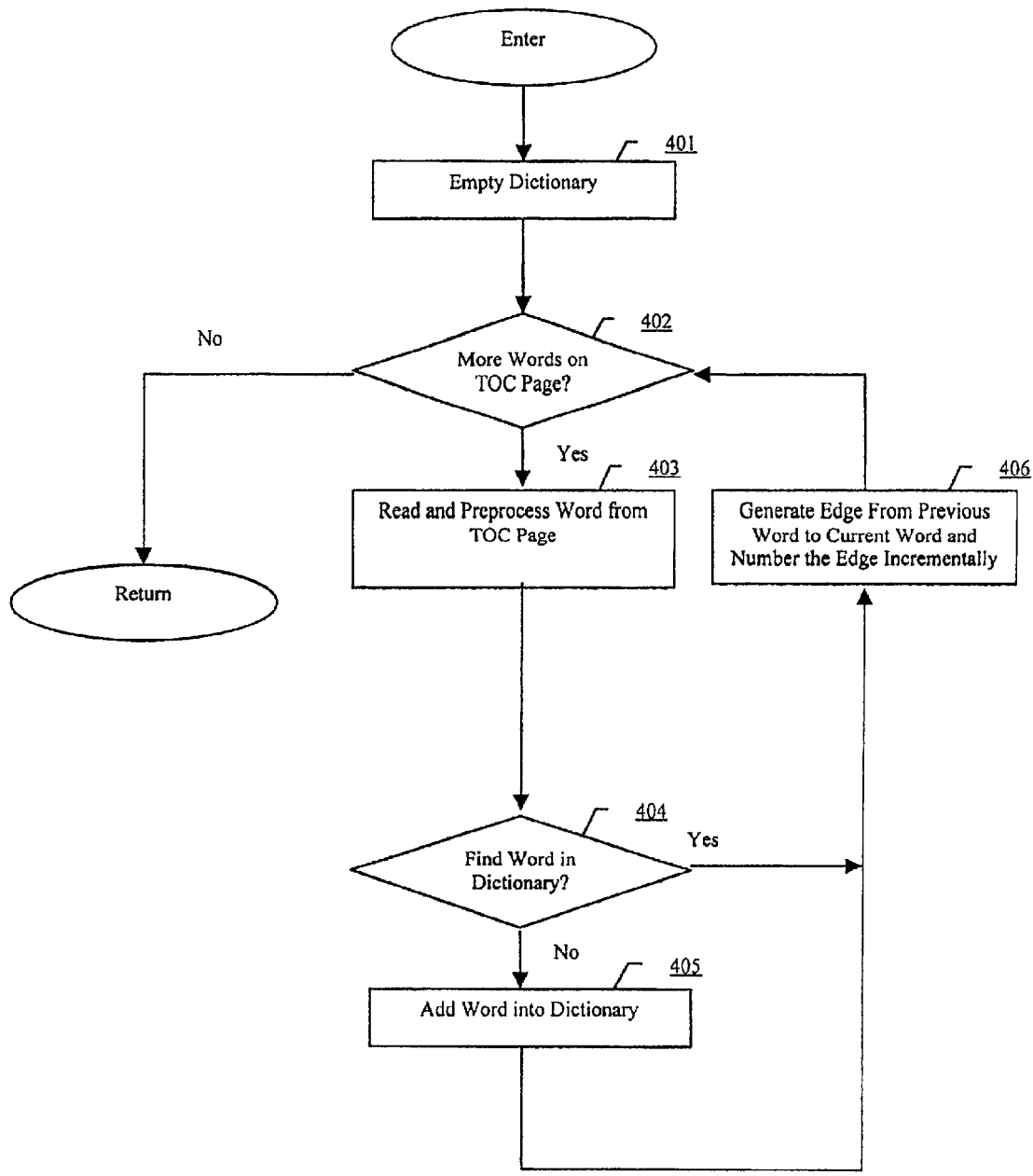

403

METHOD FOR DETERMINING A LOGICAL STRUCTURE OF A DOCUMENT

FIELD OF INVENTION

Various embodiments of the present invention relate to the field of electronic document analysis.

BACKGROUND OF THE INVENTION

Existing Optical Character Recognition (OCR) software can convert scanned paper documents into an electronic version, which contains the ASCII/Unicode text and page-level structures such as text/graphics blocks. However, for books/journals with many pages it is desirable to automatically generate the book/journal level structure, for example, to split a whole book/journal into individual articles.

One benefit of splitting a book/journal into individual articles is to speed Web browsing and to reduce Web traffic. One common usage of the electronic versions of books/journals is to make them available on the Web for users to browse or download remotely. Usually the file for a whole book/journal can have a size ranging from several megabytes to tens of megabytes, depending on the number of pages and the contents of the pages. It will take a long time to download the file if the user only has low-speed Internet access, such as the dial-up service. Accordingly, if the book/journal is already spit into smaller units such as individual articles, the user can simply download the contents he/she is interested in, thus reducing Web traffic load for the content provider if people are only downloading pieces of the contents. Another benefit of splitting a book/journal into individual articles is to satisfy business considerations. In certain instances, the publisher provides the electronic contents for a fee. In this case, the user often wants to pay for only the parts interesting him/her. By providing content split into individual articles, the user can access only the parts they desire. Yet another benefit afforded by splitting a book/journal into individual articles is that it facilitates ease of use. Even for users who have the whole book/journal, it is still desirable to organize the contents logically to facilitate navigation and browsing.

Although human operators can split a book/journal/magazine into separate articles, this kind of manual processing tends to be slow, tedious and expensive. It is desirable to have a system that enables a computer to automatically analyze the logical structure of books/journals and split them into individual chapters/articles. In the prior art, there are two categories of methods to obtain the logical structure:

One category of methods obtains the logical structure by using only page/chapter/article numbers printed on table-of-content (TOC) pages (or the content pages) to find individual articles and analyze only the TOC pages to get other relevant information such as the article titles and author names. There are several disadvantages associated with relying only on the TOC pages. For one, OCR may make errors in recognizing the page numbers in the content pages. In this situation, the wrong page numbers are obtained or page numbers may be missed and accordingly split the journals in the wrong way. Additionally, where the page numbers are correctly recognized, there still may be false-negative or false-positive errors in deciding whether a digit string is a page number because there are often other digits strings besides page numbers on the TOC pages. Furthermore, in some magazines the page numbers on the TOC pages and/or individual articles are printed in special formats so that the OCR engine cannot recognize them at all. Moreover, in order to get the article titles and author names, the layout of the TOC pages must comply with certain templates. Some implementations depend on natural language processing (NLP) to extract article names and author names and accordingly are limited to specific languages.

Another category of methods obtains the logical structure by depending on text format information in the body pages (e.g., the pages of individual articles/chapters, excluding TOC pages). For example, if and only if article titles are in "30 point bold Times Romans", that format can be used to locate the boundary of articles. There are disadvantages associated with this category of methods. For one, current OCR technology is not reliable enough to accurately determine the text format, limiting this method to analyzing computer-originated documents (for example, PDF or Postscript files generated from word-processing software). Furthermore, sometimes the same format is used to provide different functions within a book/journal (e.g., the same format is used for both the article title and sub-section title).

SUMMARY OF THE INVENTION

A method for determining a logical structure of a document is presented. The document comprises at least one table of contents page comprising a plurality of table of contents words and a plurality of body pages, wherein at least one body page comprises a plurality of body words. At least one candidate table of contents page of the document is determined. A dictionary is built for the candidate table of contents page, the dictionary comprising at least one table of contents word. One body page is analyzed for at least one text match between the plurality of body words and the table of contents words of the dictionary. Based on an evaluation the text match, it is determined whether the body page is a title page.

BRIEF DESCRIPTION OF THE DRAWINGS

The accompanying drawings, which are incorporated in and form a part of this specification, illustrate embodiments of the invention and, together with the description, serve to explain the principles of the invention:

FIGS. 2A and 2B illustrate steps in a process of determining the logical structure of a document, in accordance with one embodiment of the present invention.

FIG. 3 illustrates steps in a process of determining a candidate table of contents page in accordance with one embodiment of the present invention.

FIG. 4 illustrates steps in a process of building a dictionary and a graph representation for a candidate table of contents page in accordance with one embodiment of the present invention.

BEST MODE(S) FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and the scope of the invention as defined by the appended claims. Furthermore, in the following detailed description of the present invention, numerous specific details are set forth in order to provide a thorough understanding of the present invention. However, it will be apparent to one skilled in the art that the present invention may be practiced without these specific details. In other instances, well-known methods, procedures, components, structures and devices have not been described in detail so as to avoid unnecessarily obscuring aspects of the present invention.

Figure 1:
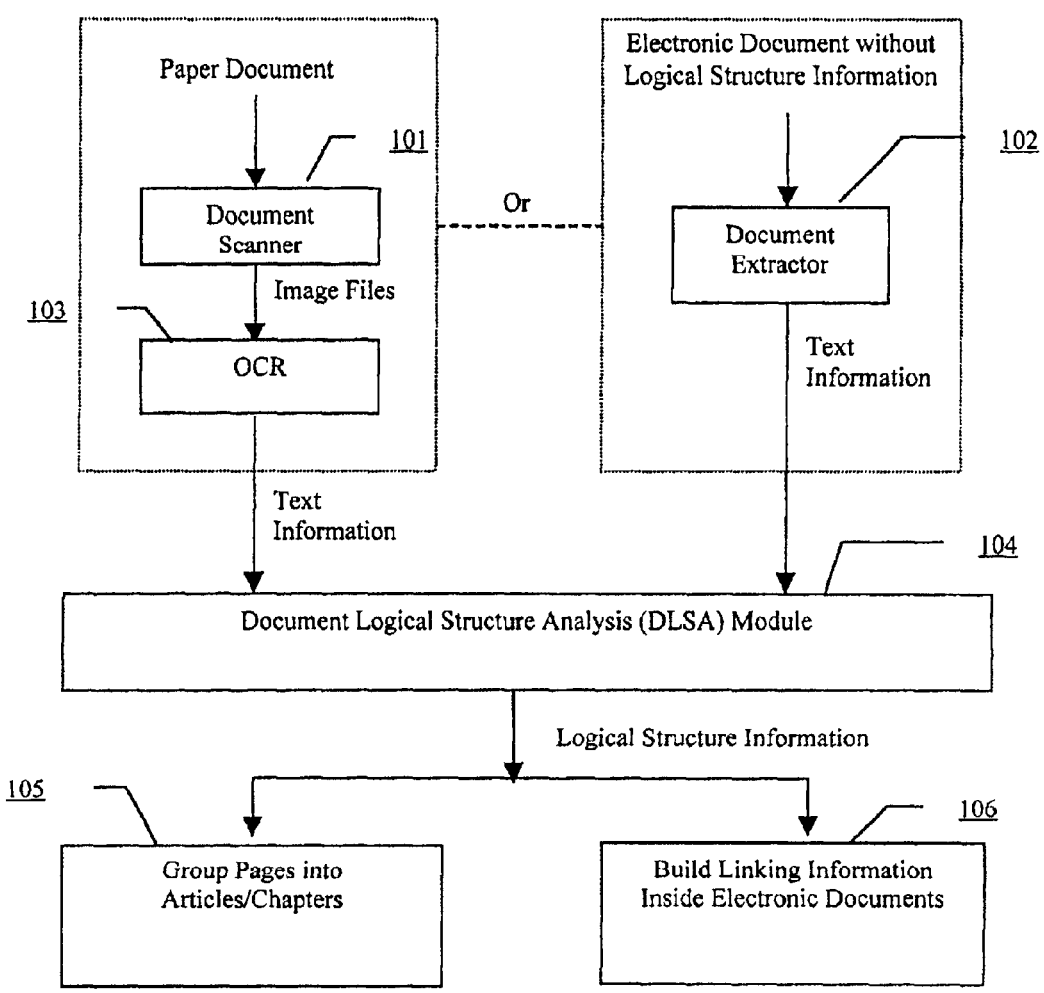
FIG. 1 is a block diagram of a document processing system upon which embodiments of the present invention may be practiced.

FIG. 1 is a block diagram of a document processing system 100 upon which embodiments of the present invention may be practiced. In one embodiment, document processing system 100 comprises a scanner 101 for receiving a paper document and a computer system comprising Optical Character Recognition (OCR) software 103 stored therein. Scanner 101 scans a paper document and transmits image files of the paper document to OCR software 103. OCR software 103 generates text information based on the image files, and transmits the text information to a computer system comprising document logical structure analysis (DLSA) module 104. In another embodiment, document processing system 100 comprises a computer system comprising document extractor 102. Document extractor 102 receives an electronic document, generates text information based on the electronic document, and transmits the text information to DLSA module 104.

For purposes of the present application, it should be appreciated that the term document refers to both a paper document or an electronic document as described above. In one embodiment, a document comprises at least one table of contents (TOC) page and at least one body page. For example, a 300 page journal may have five TOC pages and 295 body pages. Each page comprises at least one word. In one embodiment, a page comprises words coded in formats such as ASCII format or UNICODE format. Specifically, a TOC page comprises at least one TOC word and a body page comprises at least one body word.

In one embodiment, the input (e.g., text information) to DLSA module 104 is multiple continuous pages, some pages of which are table of content (TOC) pages. In one embodiment, the words in the same page are approximately in natural reading order. In one embodiment, the results of DLSA module 104 group the pages of a document into articles/chapters 105. In another embodiment, the results of DLSA module 104 build linking information 106 inside the document. In the present embodiment, an article/chapter can be accessed from a TOC page by directly activating a link to the article/chapter.

FIGS. 2A and 2B illustrate steps in a process 200 of determining the logical structure of a document in accordance with one embodiment of the present invention. In one embodiment, process 200 is carried out by processors and electrical components under the control of computer readable and computer executable instructions. In one embodiment, process 200 is carried out by DLSA module 104 of FIG. 1. Although specific steps are disclosed in process 200, such steps are exemplary. That is, the embodiments of the present invention are well suited to performing various other steps or variations of the steps recited in FIGS. 2A and 2B.

At step 201 of process 200, at least one TOC page is chosen. FIG. 3 illustrates steps in a process 201 of determining a candidate TOC page(s) in accordance with one embodiment of the present invention. At step 301, it is determined whether there is any prior knowledge of the location of the TOC page(s) within the document. Provided the location of the TOC pages is known, as shown at step 302, the TOC page(s) is chosen directly. For example, the TOC page(s) is chosen directly to process a certain type of journal in which the first page is always the only TOC page.

Alternatively, provided the location of the TOC page(s) is not known, as shown at step 303, at least one candidate TOC page is chosen. In one embodiment, the first N pages are chosen as candidate TOC pages where N is any whole number less than the number total number of pages of the document. For example, because the TOC pages are often located at the beginning of a book or journal, the first 20 (e.g., N=20) pages may be selected as candidate TOC pages. Process 201 then proceeds to step 202 of FIG. 2A.

In one embodiment, process 200 is repeated for every candidate TOC page. With reference to step 202 of FIG. 2A, it is determined whether there is another candidate TOC page. Provided there are not more candidate TOC pages, process 200 ends. Alternatively, provided there are more candidate TOC pages, process 200 proceeds to step 203. At step 203, the next candidate TOC page is accessed. For purposes of the present application, it should be appreciated that the candidate TOC page discussed at steps 203 through 209 is the current TOC page.

At step 204, a dictionary and a graph representation are built for the candidate TOC page. FIG. 4 illustrates steps in a process 204 of building the dictionary and the graph for a candidate TOC page in accordance with one embodiment of the present invention. At step 401, the dictionary is emptied. In one embodiment, steps 402–404 are repeated for every word of the current TOC page. At step 402, it is determined whether there are more words to enter into the dictionary. Provided there are no more words to enter, process 204 proceeds to step 205 of FIG. 2A. Alternatively, provided there are more words to enter, process 204 proceeds to step 403.

Figure 5:
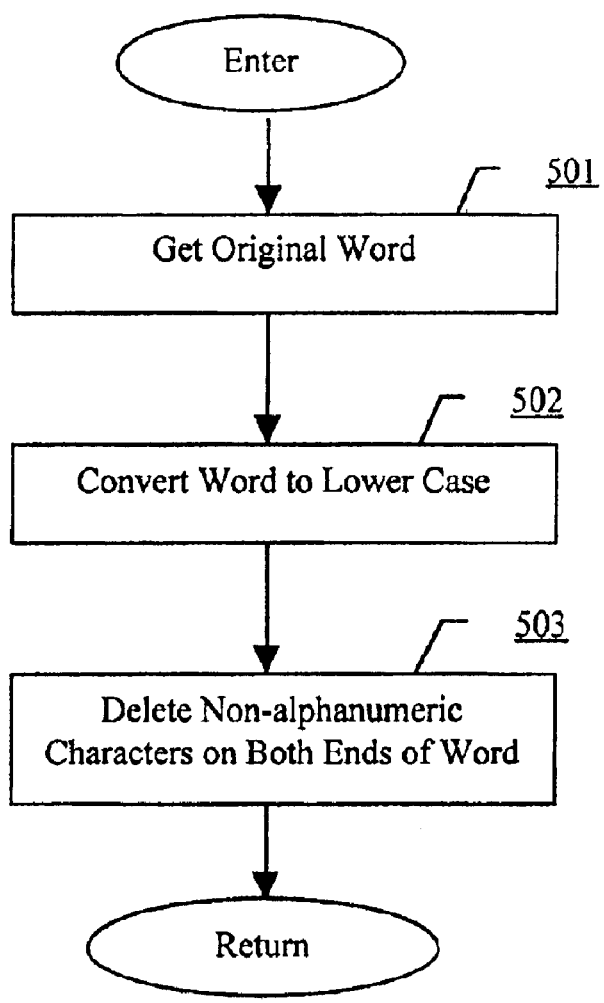
FIG. 5 illustrates steps in a process of converting words to a uniform standard in accordance with one embodiment of the present invention.

At step 403, the current word is read and preprocessed into a uniform standard. In one embodiment, in order to match words with insignificant variations, the word is uniformly converted to uniform standard. FIG. 5 illustrates steps in a process 403 of converting words to a uniform standard in accordance with one embodiment of the present invention. At step 501, the word is accessed. At step 502, the word is converted into lower case characters (e.g., all upper case characters are converted into lower case). At step 503, all non-alphanumeric characters on both ends of the word are deleted. For example, the original word "Dixon," becomes "dixon" after the preprocessing. Upon completing step 503, process 403 proceeds to step 404 of FIG. 4.

At step 404 of FIG. 4, the dictionary is examined to see if the word is already in it. Provided the word is found, process 204 proceeds directly to step 406. Provided the word is not found, as shown at step 405, the word is added into the dictionary, and process 204 then proceeds to step 406.

Figure 14:
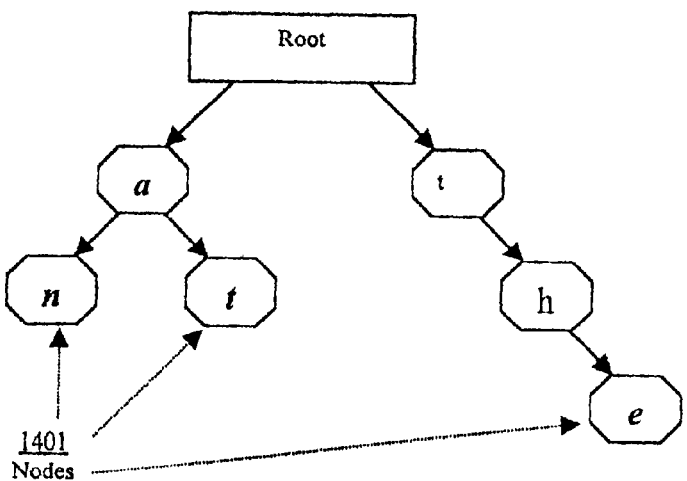
FIG. 14 is a data structure diagram of an exemplary tree dictionary structure based on a table of contents page in accordance with one embodiment of the present invention.

In order to accelerate the searching process, the dictionary is organized into at least one data structure. In one embodiment, two data structures are built, a tree-structured dictionary listing all the words on the TOC page, and a graph representation showing the words linked one by one in the natural reading order. FIG. 14 is a data structure diagram of an exemplary tree-structured dictionary 1400 based on a TOC page in accordance with one embodiment of the present invention. Each node 1401 indicates a letter of a word, wherein a node represented by bold italicized font can serve as an end letter of a word. Tree 1400 contains the words "a", "an", "at" and "the".

Figure 15:
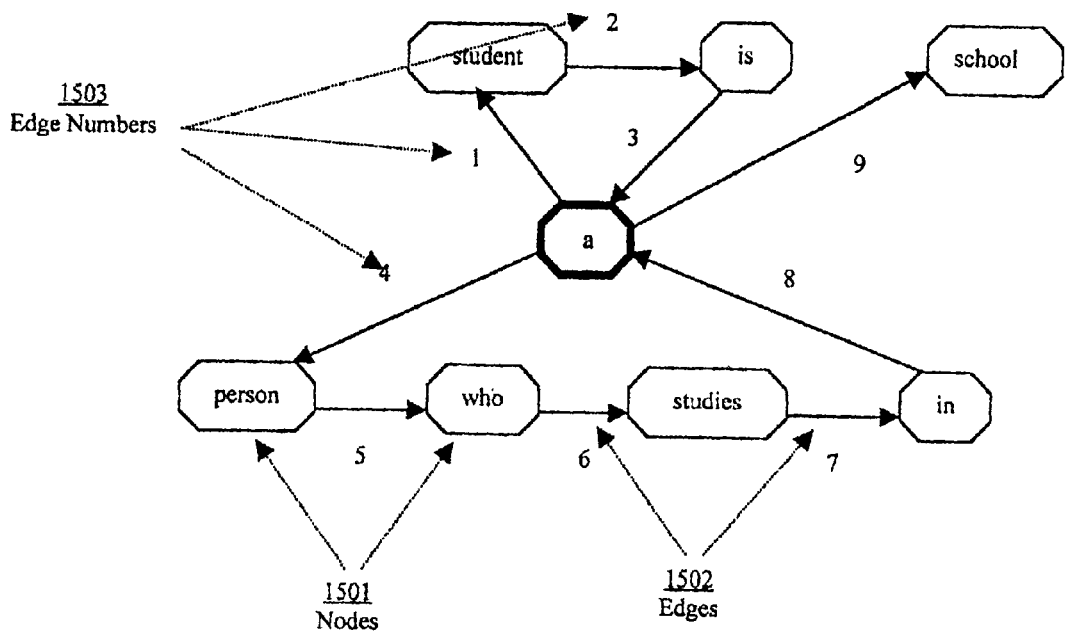
FIG. 15 is a data structure diagram of an exemplary graph representation of a table of contents page in accordance with one embodiment of the present invention.

At step 406 of FIG. 4, an edge is generated from a previous word to the current word. The edge is numbered incrementally based on the previous word. FIG. 15 is a data structure diagram of a graph representation 1500 of a TOC page in accordance with one embodiment of the present invention. A graph refers to a data structure wherein neighboring nodes (e.g., words) are connected by edges. The neighboring nodes 1501 (e.g., words) are connected by an edge 1502 pointing from a node 1501 to the following node 1501. The edges are numbered incrementally (e.g., edge numbers 1503) so that the text flow can be fully recovered from the directional graph. For example, the text represented in graph 1500 is "a student is a person who studies in a school". The data structure of an edge also stores the start word and the end word to facilitate a later matching procedure.

With reference to FIG. 4, upon completing step 406, process 204 proceeds to step 402. Provided there are no more TOC words to enter, process 204 proceeds to step 205 of FIG. 2A.

At step 205 of FIG. 2A, the range list (e.g., RangeList) is cleared. A range list is a collection of ranges. A range is a data structure used in matching TOC words to body words. A range refers to a series of continuous edges in the TOC page graph and it has two fields: EdgeNo is the starting edge and Len is the number of words. For example, in FIG. 15 a range with EdgeNo=1 and Len=3 corresponds to the sequence "a student is."

In one embodiment, all the body pages are processed and matched with the current candidate TOC page. In one embodiment, the body pages include all the pages after the TOC page(s). For example, if the TOC page is page 10, pages 11 through the last page are all considered body pages. At step 206 of FIG. 2A, it is determined whether there are more unprocessed body pages of the document. Provided there are no more body pages to process, process 200 proceeds to step 209 of FIG. 2B. Alternatively, provided there are more body pages to process, process 200 proceeds to step 207.

Figure 6:
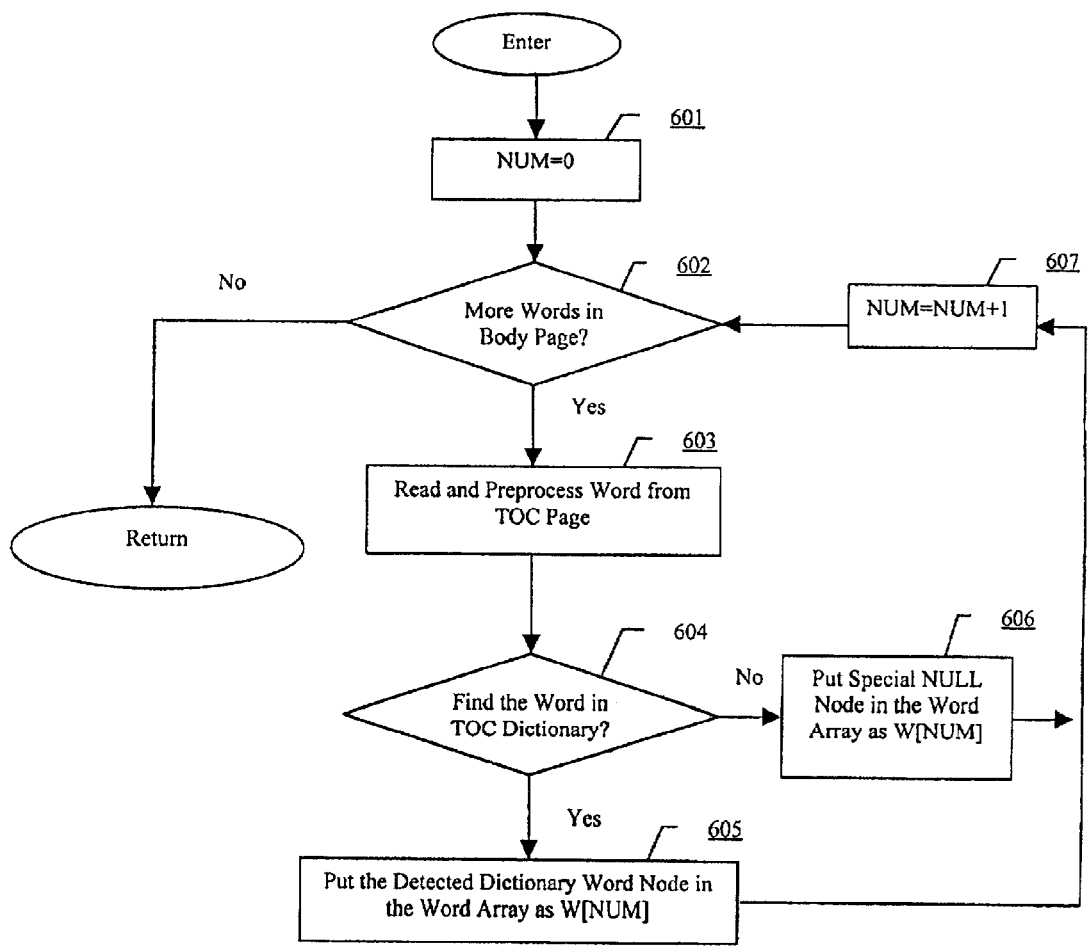
FIG. 6 illustrates steps in a process of analyzing the text of a body page against the candidate table of contents page dictionary in accordance with one embodiment of the present invention.

At step 207, the next body page is read and analyzed, and a word node list is generated. FIG. 6 illustrates steps in a process 207 of analyzing the text of a body page against the candidate TOC page dictionary in accordance with one embodiment of the present invention. At step 601 of process 207, the word number (e.g., NUM) is set to zero. The word number indicates which word, starting from the first word on a page and proceeding in order (e.g., the word in the upper left corner, and moving left to right and moving down the page), of the current body page that process 207 is analyzing. In one embodiment, process 207 is repeated for every word in the current body page. At step 602, it is determined if there are any more words to process in the body page. Provided there are no more words to process (e.g., where the word number plus one is greater than the total number of words in the page), process 207 proceeds to step 208 of FIG. 2A.

Provided there are more words to process, process 207 proceeds to step 603. At step 603, the current body word is read and preprocessed into a uniform standard. In one embodiment, in order to match words with insignificant variations, the word is uniformly converted to uniform standard. In one embodiment, the words are converted according to process 403 of FIG. 5. At step 604, it is determined whether the current body word is found within the TOC dictionary.

Provided the current body word is found within the TOC dictionary, as shown at step 605, the found word is added to the output word node array. In one embodiment, the word node is entered into the word array as W[NUM]. Alternatively, provided the current body word is not found within the TOC dictionary, as shown at step 606, a null node is entered into the output word node array. In one embodiment, provided a word in the body page is not in the TOC dictionary, a special placeholder mark NULL is added to the word node array. For example, after being scanned against the TOC text in FIG. 15, the text "a person who works in a company" would become the following word array:

Node(a) Node(person) Node(who) Node(NULL) Node(in) Node(a) Node(NULL)

In one embodiment, the null node is entered into the word array as W[NUM].

At step 607 of process 207, the word number is incremented by one (e.g., NUM=NUM+1). As described above, provided there are no more words to analyze, process 207 proceeds to step 208 of FIG. 2A. Alternatively, provided there are more words to analyze, process 207 repeats steps 603 through 607 until there are no more body words left to analyze. Process 207 then proceeds to step 208 of FIG. 2A.

Figure 7:
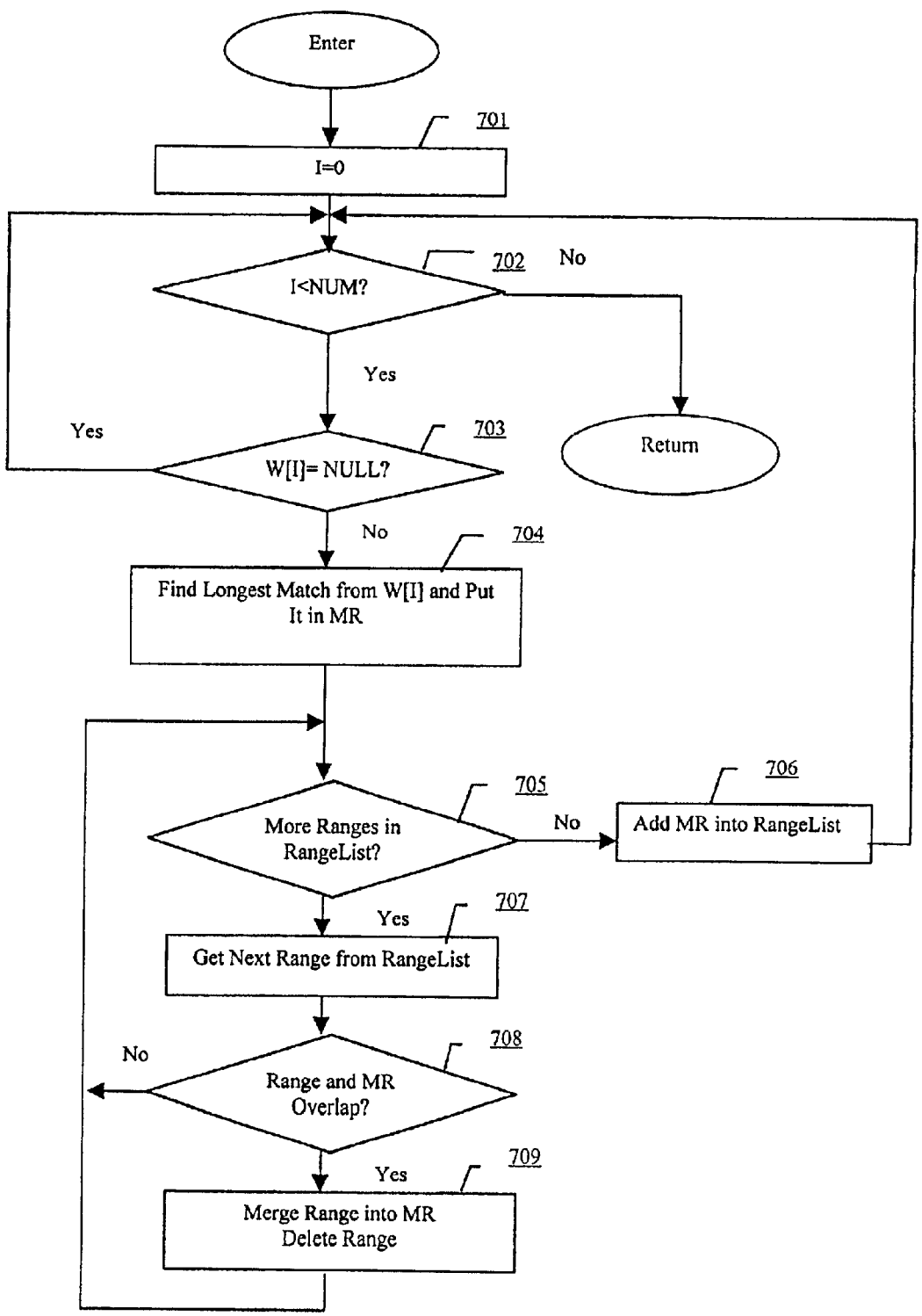
FIG. 7 illustrates steps in a process of matching the table of contents page with a body page in accordance with one embodiment of the present invention.

At step 208 of FIG. 2A, the words in the word node list generated at step 207 are processed one by one against the TOC page. FIG. 7 illustrates steps in a process 208 of matching the TOC page with a body page in accordance with one embodiment of the present invention. The words in the word node list generated at step 207 are processed one by one. At step 701, the word counter is set to zero (e.g., I=0). At step 702, it is determined whether the word counter is less than the word number (e.g., NUM of FIG. 6). Provided the word counter is not less than the word number, process 208 proceeds to step 206 of FIG. 2A. Alternatively, provided the word counter is less than the word number, process 208 proceeds to step 703. At step 703 it is determined whether the word array for the current word counter (e.g., W[I]) is NULL. Provided the word counter is NULL, process 208 returns to step 702. Alternatively, provided the word counter is not NULL (e.g., the first nonzero word), process 208 proceeds to step 704.

Figure 8:
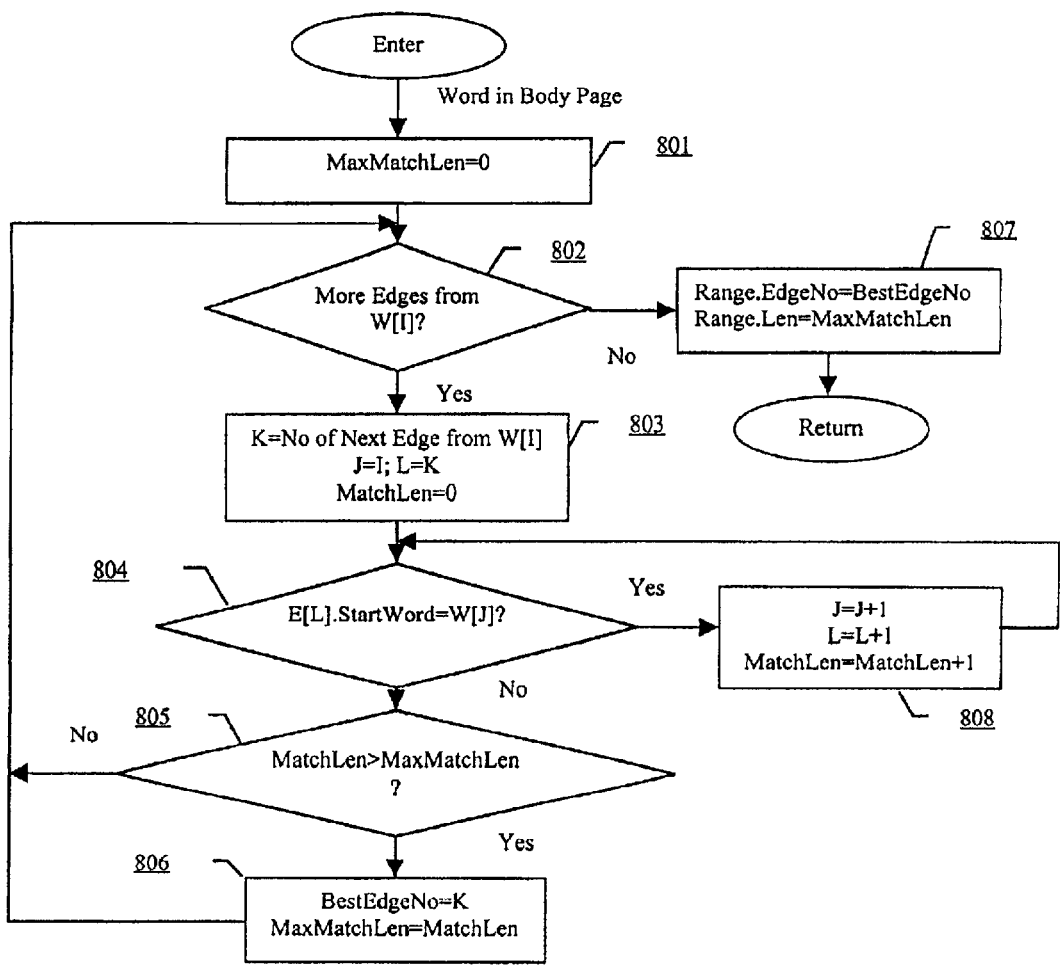
FIG. 8 illustrates steps in a process of determining the longest match with the candidate table of contents dictionary from a word in a body page in accordance with one embodiment of the present invention.

At step 704, the longest match from W[I] is determined and entered into the match range. The best match between the TOC page and body page from W[I] is determined and the result is stored in the match range. FIG. 8 illustrates steps in a process 704 of determining the longest match with the candidate TOC dictionary from a word in a body page in accordance with one embodiment of the present invention. In one embodiment, every edge from W[I] is analyzed until the TOC page and the body page do not agree. The longest match is stored in the resulting range.

At step 801, the maximum match length (e.g., MaxMatchLen) is set to zero. Every edge from W[I] is analyzed one by one. At step 802, it is determined whether more edges from W[I] are left to be analyzed. Provided there are no more edges to be analyzed, as shown at step 807, the range edge number (e.g., Range.EdgeNo) is set to equal the best edge number (e.g., BestEdgeNo) and the range length (e.g., Range.Len) is set to equal the maximum range length. Process 704 then proceeds to step 705 of FIG. 7. Alternatively, provided there are more edges to be analyzed, as shown at step 803, the edge is analyzed, wherein K is defined as the number of the next edge from W[I], J is defined as the value of is defined as the value of K, and the match length (e.g., MatchLen) is set to 0.

At step 804, it is determined whether the start word of the edge array (e.g., E[L].StartWord) is equal to W[J]. Provided the start word of the edge is equal to W[J], the following edge is analyzed, as shown at step 808 (e.g., J=J+1, L=L+1, and MatchLen=MatchLen+1). Process 704 then returns to step 804. Alternatively, provided the start word to the edge array is not equal to W[J], as shown at step 805, it is determined whether the match length is greater than the maximum match length. Provided the match length is not greater than the maximum match length, process 704 returns to step 802. Alternatively, provided the match length is greater than the maximum match length, process 704 proceeds to step 806. At step 806, the best edge number is set equal to K and the maximum match length is set equal to the match length. Process 704 then returns to step 802.

With reference now to FIG. 7, the ranges in the range list are processed one by one. At step 705 it is determined whether there are more ranges to analyze in the range list. Provided there are ranges left to be analyzed, the next range is accessed from the range list, as shown at step 707.

At step 708, it is determined whether the range and the match range overlap. Provided the range and match range do not overlap, process 208 returns to step 705. Alternatively, provided the range and match range do overlap, as shown at step 709, the match range is updated with the range and the existing range is deleted from the range list. For example, as shown in FIG. 15, a range with EdgeNo=1 and Len=3 can be merged into a range with EdgeNo=3 and Len=2, and the resulting range has an EdgeNo of 1 and a Len of 4. After going through the whole range list, the match range will be appended to range list, as shown at step 706. Process 208 then returns to step 702. Once process 208 has been repeated for every range in the range list for every body page, process 208 proceeds to step 209 of FIG. 2B.

Figure 9:
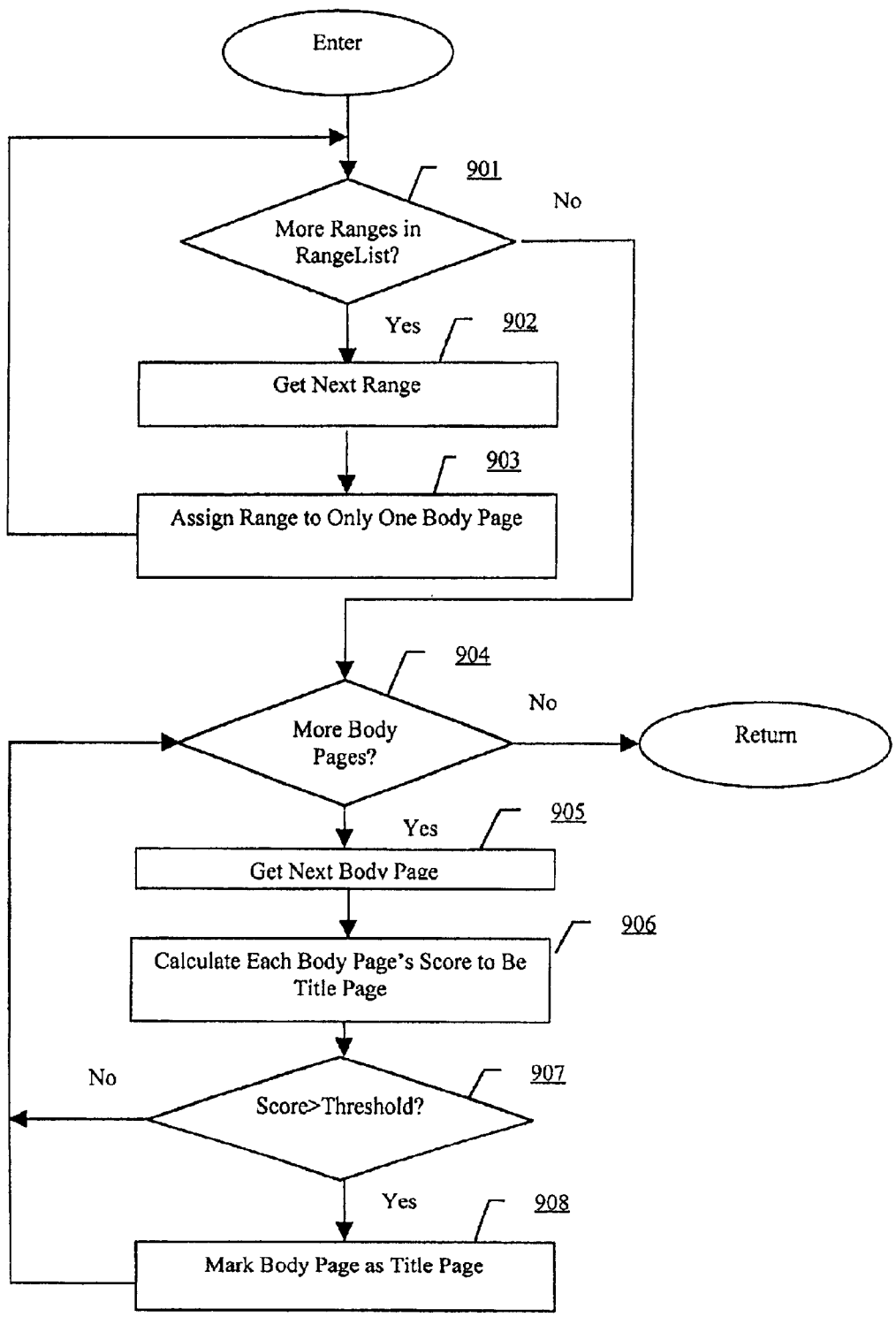
FIG. 9 illustrates steps in a process of determining whether a body page is a title page in accordance with one embodiment of the present invention.

After the matching the body page with the TOC page, the body pages are evaluated to choose the likely title pages, as shown at step 209 of FIG. 2B. FIG. 9 illustrates steps in a process 209 of determining whether a body page is a title page in accordance with one embodiment of the present invention. In one embodiment, every range is analyzed and assigned to only one body page. At step 901, it is determined whether there are more ranges in the range list left to analyze. Provided there are more ranges in the range list, the next range is accessed, as shown at step 902.

Figure 10:
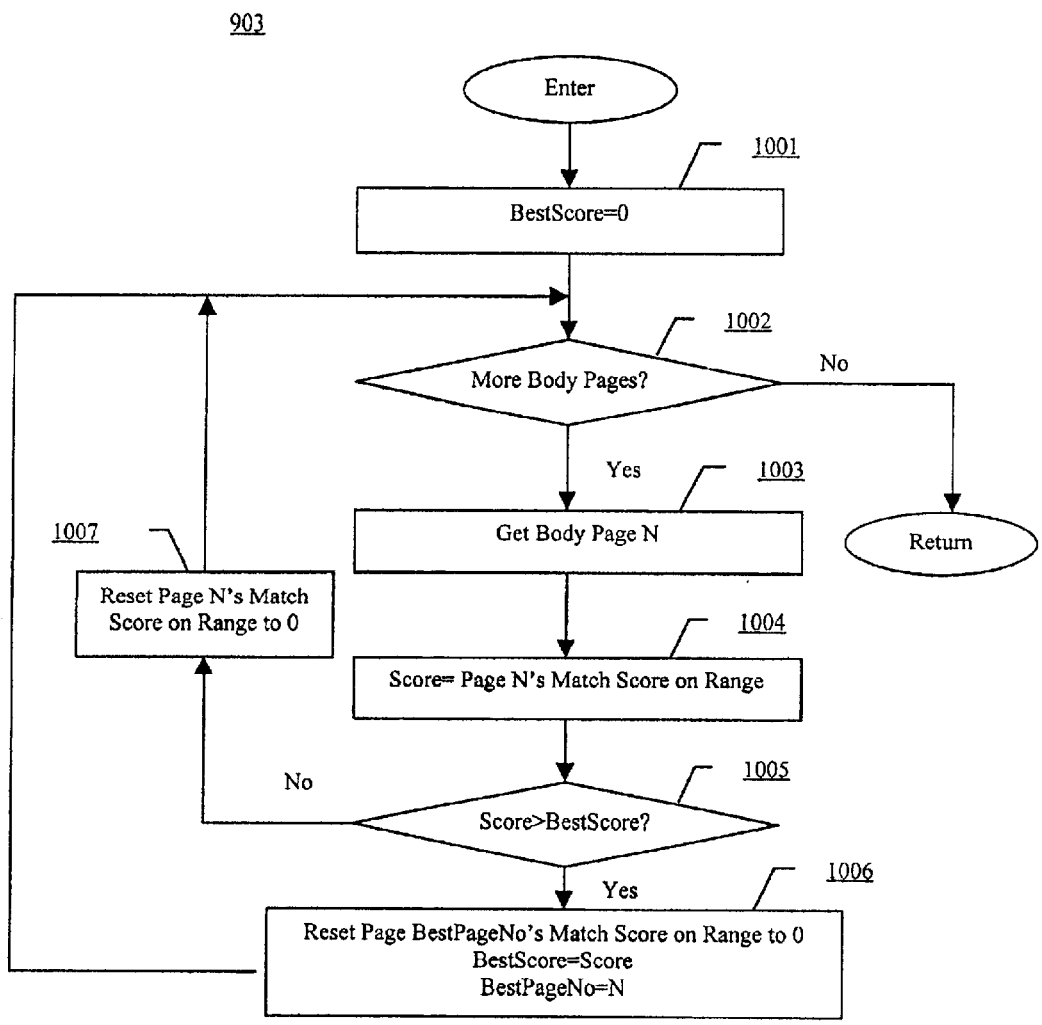
FIG. 10 illustrates steps in a process of assigning a range to one body page in accordance with one embodiment of the present invention.

At step 903, the range in the current is assigned to a body page. FIG. 10 illustrates steps in a process 903 of assigning a range to one body page in accordance with one embodiment of the present invention. In order to assign each range to only one body page the matching score between a range in the range list and every body page is calculated. At step 1001 of process 903, the best score value is set to zero (e.g., BestScore=0). Process 903 is repeated for every body page. At step 1002, it is determined whether there are any more body pages to process. Provided there are more body pages to process, as shown at step 1003, the next body page is accessed (e.g., body page N). At step 1004, the score is set to equal the match score in the range for body page N.

Only the biggest score is kept and the match score is reset to 0 for all the other body pages. At step 1005, it is determined whether the score is greater than the best score (e.g., Score>BestScore). Provided the score is greater than the best score, as shown at step 1006, the current best page's match score in the range is reset to zero, the best score is set to the score (e.g., BestScore=Score), and the best page number is set to N (BestPageNo=N). Alternatively, provided the score is not greater than the best score, as shown at step 1007, the current page's match score on the range is set to 0. Steps 1002–1007 are repeated for every body page. Once steps 1002–1007 have been repeated for every body page, process 903 returns to step 901 of FIG. 9.

With reference to FIG. 9, once every range has been assigned to one body page, process 209 proceeds to Step 904. In one embodiment, every body page is classified as a title page or a non-title page. At step 904, it is determined whether there are more body pages to analyze. Provided there are more body pages to analyze, as shown at step 905, the next body page is accessed. At step 906, a score defining the probability that the current body page is a title page is calculated.

Figure 11:
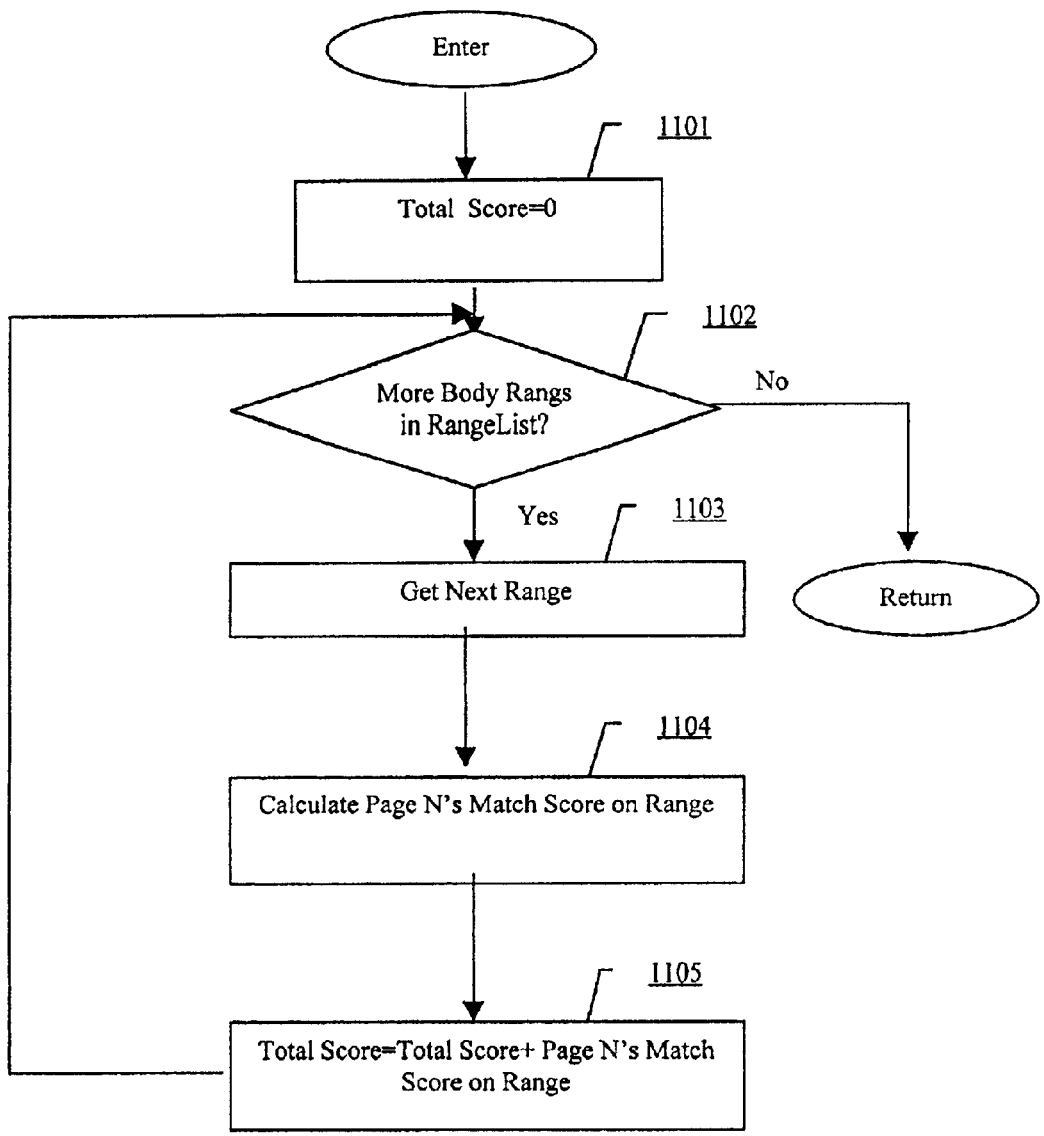
FIG. 11 illustrates steps in a process of calculating a title page score of a body page in accordance with one embodiment of the present invention.

FIG. 11 illustrates steps in a process 906 of calculating a title page score of a body page in accordance with one embodiment of the present invention. Because more than one range can be matched with the body page, the final score for each body page is the sum of the scores obtained through all the ranges. Thus, it is necessary to eliminate insignificant matches. At step 1101 of process 906, the total score is set to zero (e.g., Total Score=0). In one embodiment, process 906 is repeated for every body range of the range list. At step 1102, it is determined whether there are more body ranges in the range list to be analyzed. Provided there are more ranges to be analyzed, as shown at step 1103, the next range is accessed.

At step 1104, the body page's match score on a range is calculated. In one embodiment, the matched text is given a higher score if it is more likely to be the article title or author name. In one embodiment, the text match length (Len) is the basis for the scoring (S1). It should be appreciated that a number of other factors may be considered in the scoring process to further reduce ambiguity:

- Character case (S2): If the first matched character is in upper case, the matched text is more likely to be a title.
- Line end or start (S3, S4): If the matched text starts or ends a line, it is more likely to be a title.
- The maximal word length (S5): If the matched text only contains short words, it is less likely to be an article or author name.
- Text font size (S6): If the matched text is in large font, it is more likely to be a title.

In one embodiment, the following formula is used to calculate the match score:

Overall Score=$S1*S2*S3*S4*S5*S6$ wherein S1 is derived from the following look-up table:

| Len | 0 | 1 | 2 | 3 | 4 | 5 | >5 |
|---|---|---|---|---|---|---|---|
| S1 | 0 | 12 | 25 | 37 | 53 | 93 | 113 | wherein S2, S3 and S4 are derived from the following:

$$S2 = \begin{cases} 1 & \text{(if the first matched word starts in upper case)} \\ 0.7 + 0.3 * X/Len & \text{(otherwise)} \end{cases}$$

wherein X is the number of matched words starting with an upper case letter;

$$S3 = \begin{cases} 1 & \text{(otherwise)} \\ 1.5 & \text{(if the first matched word starts a line)} \end{cases}$$

$$S4 = \begin{cases} 1 & \text{(otherwise)} \\ 1.5 & \text{(if the first matched word finishes a line)} \end{cases}$$

wherein S5 is derived from the following look-up table, wherein MaxNum is the number of characters in the longest matched word:

| MaxNum | 0 | 1 | 2 | 3 | >3 |
|---|---|---|---|---|---|
| S5 | 0.2 | 0.4 | 0.6 | 0.8 | 1.0 | and wherein S6 is derived according to:

$$S6 = \begin{cases} 1.0 & (Y < 1.0) \\ Y & \\ 3.0 & (Y > 3.0) \end{cases}$$

wherein $Y = \dfrac{\text{Average height of matched words}}{\text{Average word height in the whole page}}$ At step 1105 of process 906, the total score is set equal to the total score plus page N's match score on the range (e.g., Total Score=Total Score+Page N's Match Score on Range). Upon completing step 1105, process 906 returns to step 1102. Steps 1102–1105 are repeated for every range. Once steps 1102–1105 have been repeated for every range, process 906 proceeds to step 907 of FIG. 9.

At step 907, it is determined whether the score is greater than a threshold value. In one embodiment, the threshold value is 152. Provided the score is greater than the threshold value, as shown at step 908, the body page is marked as a title page. Alternatively, provided the score is not greater than the threshold value, process 209 returns to step 904. Once steps 904–908 have been repeated for every body page, process 209 proceeds to step 210 of FIG. 2B. It should be appreciated that the title page determination of process 209 is not final because at a later stage (e.g., step 210 of FIG. 2B) it is determined whether the candidate TOC page is a real TOC page and this all the detected title pages will not be counted.

Figure 12:
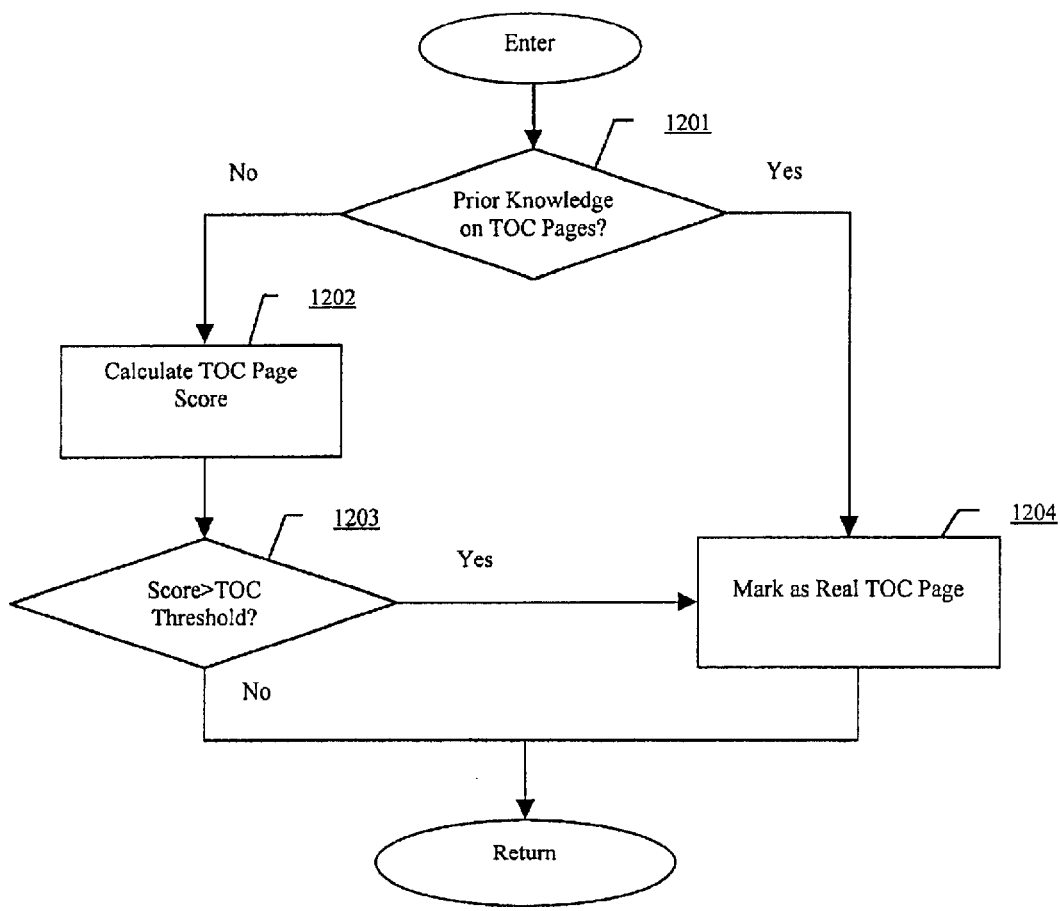
FIG. 12 illustrates steps in a process of calculating a candidate table of contents page score in accordance with one embodiment of the present invention.

At step 210 of FIG. 2B, it is determined whether the candidate TOC page is a real TOC page. In one embodiment, to determine whether the candidate TOC page is a real TOC page, it is necessary to calculate the score of the candidate TOC page. FIG. 12 illustrates steps in a process 210 of calculating a candidate TOC page score in accordance with one embodiment of the present invention. In one embodiment, several features are computed and a score is calculated based on the features.

At step 1201 of process 210, it is determined whether there was prior knowledge as to the location of the TOC pages. Provided the TOC page is chosen because of prior knowledge (e.g., step 302 of FIG. 3), it is immediately assigned as a real TOC page, as shown at step 1204. Alternatively, if the TOC page was not chosen based on prior knowledge, it is necessary to calculate the TOC page score, as shown at step 1202. In one embodiment, several features are extracted. Based on these features, a score is calculated. In one embodiment, the features considered include, but are not limited to:

- The number of detected title pages based on the candidate TOC page: if many title pages are detected for the candidate TOC page, the candidate is more likely to be a real TOC page.
- The percentage of matched lines and matched words in the candidate TOC page: if a large percentage of lines and words contain matches with body pages, the chance is bigger.
- The average match position: if many matches start within the first couple of words in the lines, it is more likely to be a real TOC page.

In one embodiment, the final score for the candidate TOC page is calculated according to:

$T=T1+T2+T3$ wherein T1, T2 and T3 are:

$$T1 = \begin{cases} 6*Ctp & (Ctp \leq 8) \\ 48 & (Ctp > 8) \end{cases}$$

wherein Ctp is the number of detected title pages;

T2=50*P1*(1+3*P2), wherein P1 and P2 are the percentages of matched lines and words respectively; and $$T3 = \begin{cases} 0 & (Lag > 3) \\ (3-Lag)*75 & (Lag \leq 3) \end{cases}$$

wherein Lag is the average match position.

At step 1203, it is determined whether the score exceeds a TOC threshold score. In one embodiment, the TOC threshold score is 300. Provided the score exceeds the TOC threshold score, the candidate TOC page is marked as a real TOC page, as shown at step 1204, and process 210 proceeds to step 211 of FIG. 2B. Alternatively, provided the score does not exceed the TOC threshold score, process 210 returns to step 202 of FIG. 2A.

With reference to step 211 of FIG. 2B, the body pages of the document are reviewed to determine if they are title pages. In one embodiment, each body page is reviewed one at a time. At step 212, it is determined whether there are more body pages to review. Provided there are more body pages to review, as shown at step 213, the next body page is accessed. At step 214, it is determined whether the body page's title page score is above a threshold. In one embodiment, the threshold is 152. Provided the score is not above the threshold, process 200 returns to step 212 for the next page to be processed. Alternatively, provided the score is above the threshold, the body page is marked as a title page, shown at step 215. It should be appreciated that the threshold of steps 214 and 215 is the same as the threshold value of step 907 of FIG. 9. However, the determination made at step 907 of FIG. 9 is tentative, pending the determination as to whether a candidate TOC page is a real TOC page, as determined at steps 214 and 215 of FIG. 2.

Figure 13:
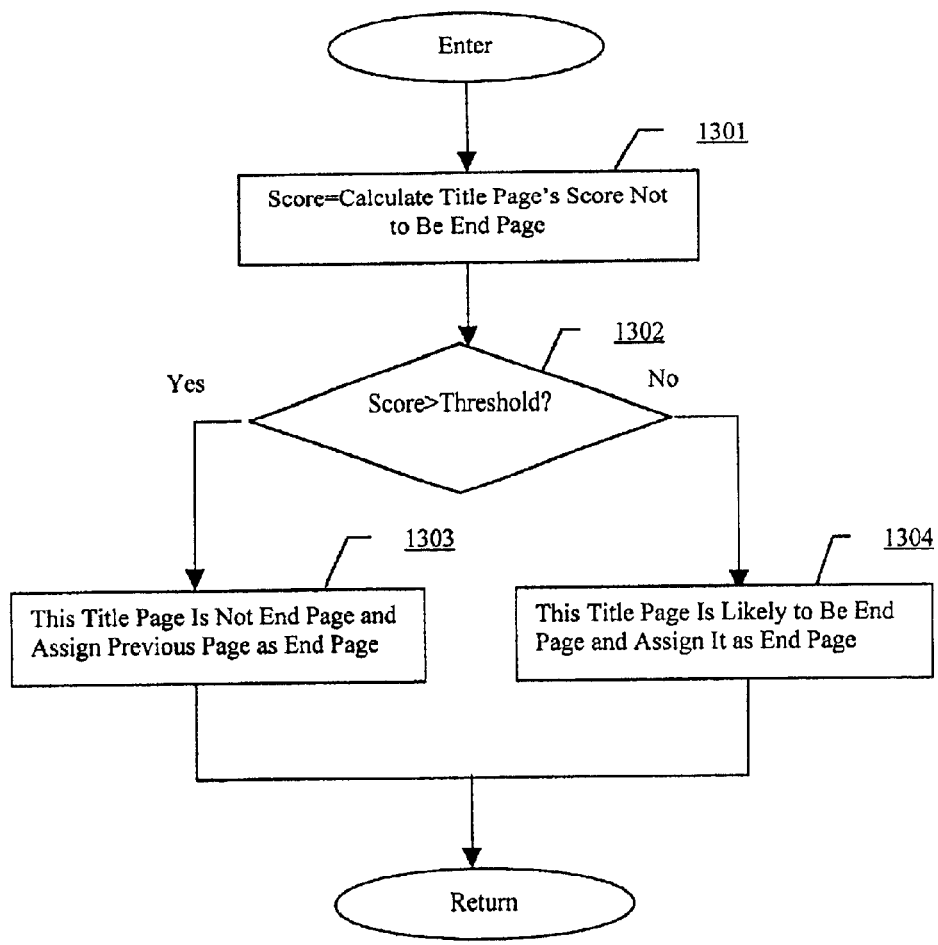
FIG. 13 illustrates steps in a process of determining an end page in accordance with one embodiment of the present invention.

At step 216 of FIG. 2, it is determined whether the title page is an end page. FIG. 13 illustrates steps in a process 216 of determining an end page in accordance with one embodiment of the present invention. At step 1301, the score for the title page not to be an end page is determined. In one embodiment, two features are considered:

Position of first match in the body page. If the first match happens in the beginning of the body page, it is more likely to be solely a title page.

Blankness of previous page. If the previous page is mostly empty, the current page is more likely to be solely a title page.

In one embodiment, the score (U) is calculated as follows:

$$U = U1 + U2$$

wherein U1 and U2 are determined according to:

$$U1 = \begin{cases} 0 & (Matchpos > 20) \\ (20 - Matchpos) * 10 & (10 \leq Matchpos \leq 20) \\ 100 & (Matchpos < 10) \end{cases}$$

wherein Matchpos is the position of the first match; and $$U2 = 100 * \left(1 - \frac{\text{Height of Text Portion in the Previous Page}}{\text{Median Height of Text Portion on All Pages}}\right).$$

At step 1302, it is determined whether the total score is above a threshold. In one embodiment, the end page threshold is 80. Provided the total score is above the threshold, as shown at step 1303, the title page is not an end page and the preceding page is selected as the end page. Alternatively, provided the total score is not above the end page threshold, as shown at step 1304, the title page is shared as the end page of another article, and is marked as an end page. Process 216 then returns to step 212 of FIG. 2B. Once steps 212–216 have been performed on all body pages, process 212 returns to step 202 of FIG. 2A. Once all candidate TOC pages have been analyzed, process 200 ends.

Figure 16:
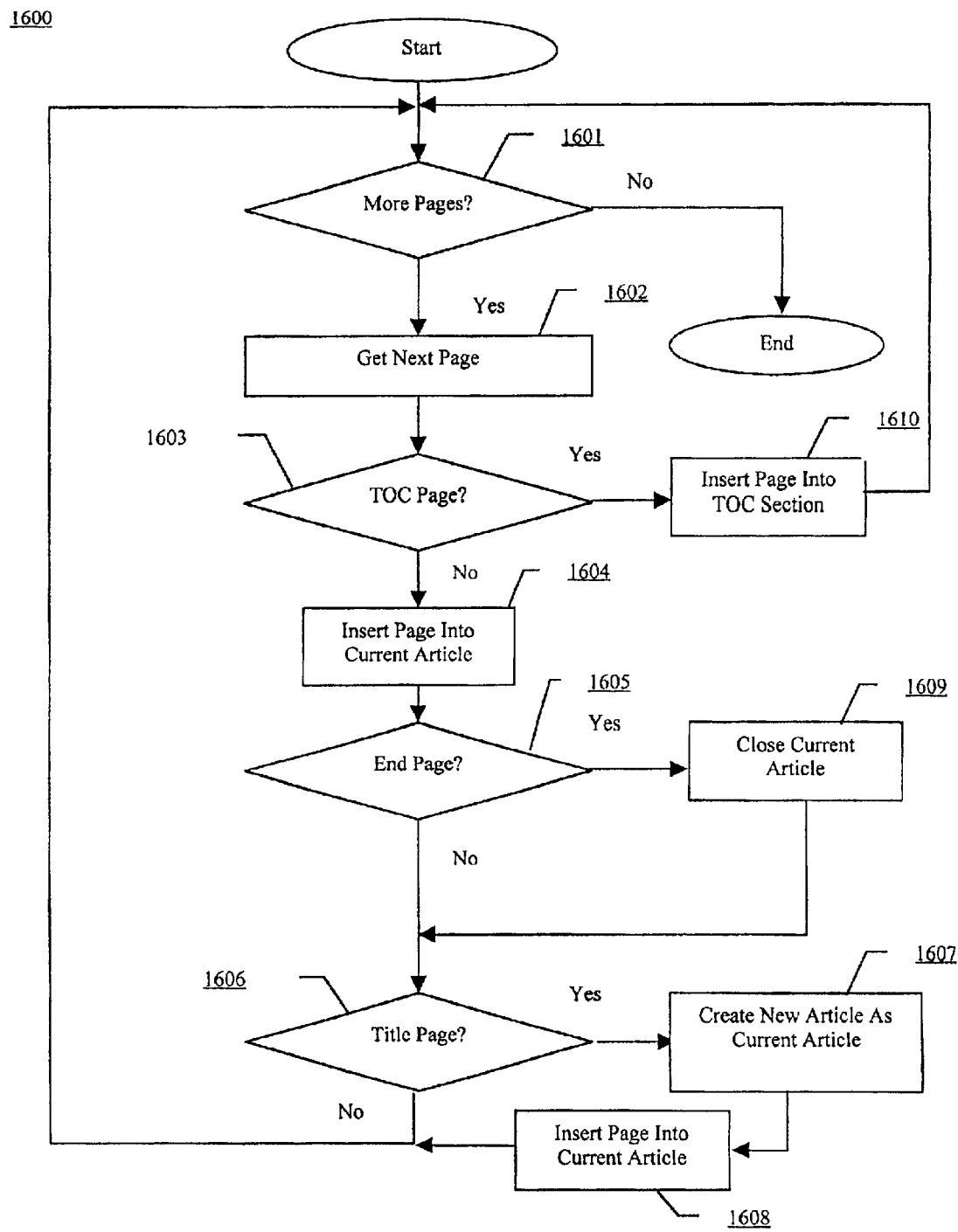
FIG. 16 illustrates steps in a process of grouping pages according to a logical structure of a document in accordance with one embodiment of the present invention.

Upon the completion of process 200, in one embodiment, the results of process 200 are used to group the pages of a document into individual articles/chapters. In another embodiment, the results of process 200 are used to build linking information to title pages inside the document. FIG. 16 illustrates steps in a process 1600 of grouping pages according to a logical structure of a document in accordance with one embodiment of the present invention. In one embodiment, process 1600 groups the pages into separate articles/chapters according to the detected title pages and end pages.

In one embodiment, process 1600 is repeated for every page of the document. At step 1601, it is determined whether there are any pages left to analyze. Provided there are pages left to analyze, as shown at step 1602, the next page is accessed. At step 1603 it is determined whether the current page is a TOC page. Provided the current page is a TOC page, as shown at step 1610, the page is inserted into the TOC section of the document, and process 1600 returns to step 1601 to analyze the next page. Alternatively, provided the current page is not a TOC page, as shown at step 1604, the page is inserted into the current article.

At step 1605 it is determined whether the current page has been marked as an end page. Provided the current page is an end page, as shown at step 1609, the current article is closed. At step 1606 it is determined whether the current page is a title page. Provided the current page is a title page, as shown at step 1607, a new article is created as the current article and the current page is inserted into the current article, as shown at step 1608. Process 1600 then returns to step 1601 where it is repeated for every page of the document.

Figure 17:
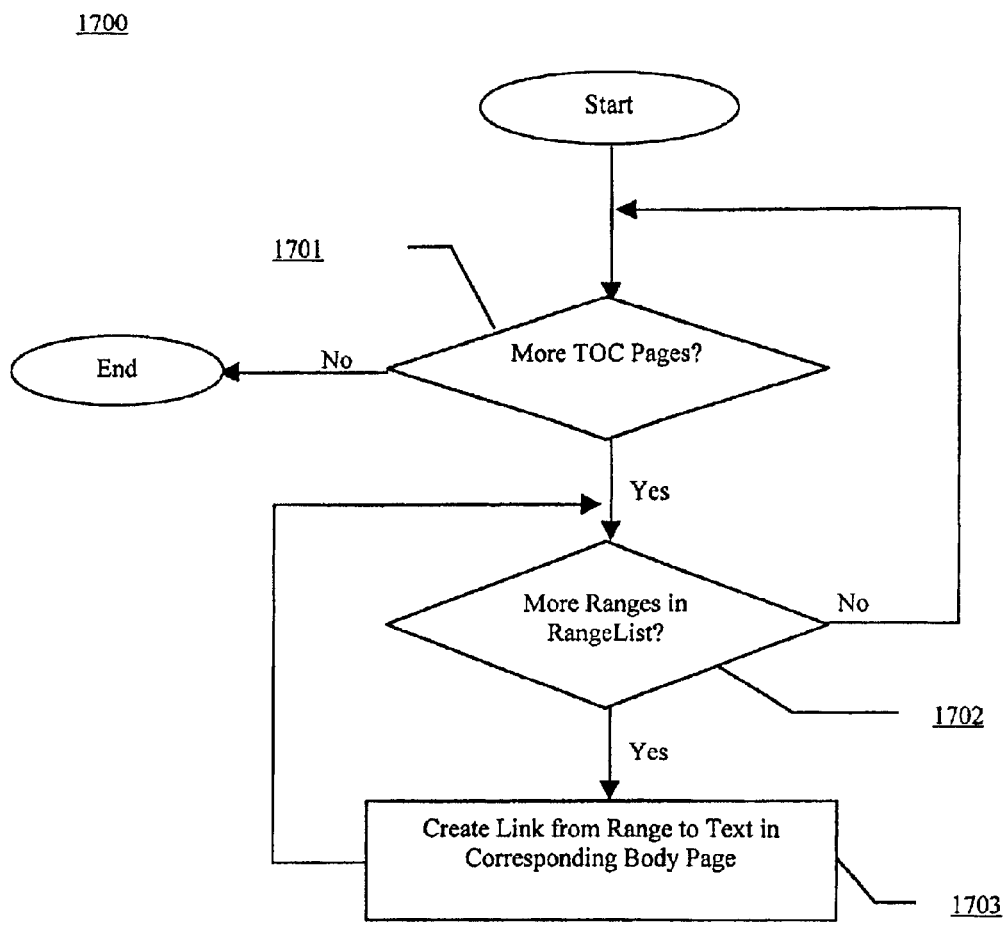
FIG. 17 illustrates steps in a process of building linking information within a document in accordance with one embodiment of the present invention.

FIG. 17 illustrates steps in a process 1700 of building linking information within a document in accordance with one embodiment of the present invention. In one embodiment, linking information is built pointing from text in TOC pages to the matched text in body pages (e.g., using hyperlinks). It should be appreciated that different document formats (e.g., PDF, HTML) having different linking specifications may be used.

In one embodiment, process 1700 is repeated for every range of the range list of every TOC page of the document. At step 1701, it is determined whether there are more TOC pages to analyze. Provided there are more TOC pages to analyze, as shown at step 1702, it is determined whether there are more ranges in the range list. Provide there are no more ranges in the range list, process 1700 returns to step 1701 in order to analyze the next TOC page. Alternatively, provided there are more ranges in the range list, as shown at step 1703, a link is created from the range to the text in the corresponding body page as determined at process 903 of FIG. 10. Process 1700 then returns to step 1702 to analyze the next range. Once steps 1701–1703 have been performed for every range of every page, process 1700 ends.

The preferred embodiment of the present invention, a method for determining a logical structure of a document, is thus described. While the present invention has been described in particular embodiments, it should be appreciated that the present invention should not be construed as limited by such embodiments, but rather construed according to the below claims.

What is claimed is:

1. A method for determining logical structure of a document comprising:

a) determining at least one candidate table of contents page of said document, said table of contents page comprising a plurality of table of contents words, said document comprising at least one table of contents page and a plurality of body pages, wherein at least one said body page comprises a plurality of body words;

b) building a dictionary for said candidate table of contents page, said dictionary comprising at least one table of contents word;

c) analyzing one said body page for at least one text match between said plurality of body words and said table of contents words of said dictionary;

d) determining whether said body page is a title page based on an evaluation of said text match.

2. A method as recited in claim 1 wherein said document is a paper document received at a scanner and converted to an electronic format by use of optical character recognition.

3. A method as recited in claim 1 wherein said document is directly extracted from an electronic document.

4. A method as recited in claim 1 wherein said candidate table of contents page is a predetermined table of contents page.

5. A method as recited in claim 1 wherein said dictionary is a tree-structured dictionary.

6. A method as recited in claim 1 wherein said candidate table of contents page is represented by a graph, wherein a node of said graph represents a table of contents word of said dictionary.

7. A method as recited in claim 1 wherein said body page is marked as a title page provided said match score is above a set threshold.

8. A method as recited in claim 1 wherein said candidate table of contents page is verified as an actual table of contents page based on said text match.

9. A method as recited in claim 1 further comprising, provided said body page is said title page, determining whether said title page is an end page based on said text match and a position of said text match on said body page.

10. A method as recited in claim 9 further comprising grouping said document into individual articles based on said title pages and said end pages.

11. A method as recited in claim 1 further comprising building linking information into said document between said table of contents page and said title page for use in navigating said document.

12. A computer-readable medium having computer-readable program code embodied therein for causing a computer system to perform a method of automatically determining a title page of a document, said method comprising:

a) determining at least one candidate table of contents page of said document, said table of contents page comprising a plurality of table of contents words, said document comprising at least one table of contents page and a plurality of body pages, wherein at least one said body page comprises a plurality of body words;

b) generating a dictionary for said candidate table off contents page, said dictionary comprising at least one table of contents word;

c) inspecting one said body page for at least one text match between said plurality of body words and said table of contents words of said dictionary;

d) determining whether said body page is a title page based on an evaluation of said text match.

13. A computer-readable medium as recited in claim 12 wherein said dictionary is a tree-structured dictionary.

14. A computer-readable medium as recited in claim 12 wherein said candidate table of contents page is represented by a graph, wherein a node of said graph represents a table of contents word of said dictionary.

15. A computer-readable medium as recited in claim 12 wherein said body page is marked as a title page provided said match score is above a set threshold.

16. A computer-readable medium as recited in claim 12 further comprising, provided said body page is said title page, determining whether said title page is an end page based on said text match and a position of said text match on said body page.

17. A computer-readable medium as recited in claim 16 wherein said document is grouped into individual article s based on said title pages and said end pages.

18. A computer-readable medium as recited in claim 12 wherein linking information is built into said document between said table of contents page and said title page for use in navigating said document.

19. A system for determining a logical structure of a document comprising:

means for determining at least one candidate table of contents page of said document, said table of contents page comprising a plurality of table of contents words, said document comprising at least one table of contents page and a plurality of body pages, wherein at least one said body page comprises a plurality of body words;

means for building a dictionary for said candidate table of contents page, said dictionary comprising at least one table of contents word;

means for analyzing one said body page for at least one text match between said plurality of body words and said table of contents words of said dictionary; and means for determining whether said body page is a title page based on an evaluation of said text match.

20. A system as recited in claim 19 wherein said dictionary is a tree-structured dictionary.

21. A system as recited in claim 19 wherein said candidate table of contents page is represented by a graph, wherein a node of said graph represents a table of contents word of said dictionary.

22. A system as recited in claim 19 further comprising means for determining whether said title page is an end page, provided said body page is said title page, based on said text match and a position of said text match on said body page.

23. A system as recited in claim 22 further comprising means for grouping said document into individual articles based on said title pages and said end pages.

24. A system as recited in claim 19 further comprising means for building linking information into said document between said table of contents page and said title page for use in navigating said document.

25. A computer-readable medium having computer-readable program code embodied therein for causing a computer system to:

receive a document, the document including a table of contents and a body;

locate the table of contents in the document;

generate table of contents words from the table of contents;

analyze the body to determine if words in the body match the table of contents words; and classify the body into at least one title page and at least one non-title page based on whether words in the body match the table of contents words.

26. The computer-readable medium of claim 25 for causing the computer system further to assign scores to different sections of the body and classify a section of the body as a title page if the section of the body has a score above a threshold value.

27. The computer-readable medium of claim 25 for causing the computer system further to choose N first pages of the document as candidates for the table of contents, wherein N is a whole number less than a total number of pages of the document.

* * * * *